(12) United States Patent
Bergstrom (10) Patent No.: US 9,509,127 B1
(45) Date of Patent: Nov. 29, 2016

(54) WIRE GUIDING TOOL (71) Applicant: John A. Bergstrom, Dassel, MN (US)

(72) Inventor: John A. Bergstrom, Dassel, MN (US)

(73) Assignee: John A. Bergstrom, Dassel, MN (US)

( * ) Notice: Subject to any disclaimer, the term of this patent is extended or adjusted under 35 U.S.C. 154(b) by 0 days.

(21) Appl. No.: 15/046,241

(22) Filed: Feb. 17, 2016

Related U.S. Application Data (63) Continuation-in-part of application No. 14/706,364, filed on May 7, 2015, now abandoned.

(60) Provisional application No. 61/996,692, filed on May 13, 2014.

(51) Int. Cl.
*H02G 1/06* (2006.01)

(52) U.S. Cl.
CPC ..................... *H02G 1/06* (2013.01)

(58) Field of Classification Search
USPC ......................................................... 174/50
See application file for complete search history.

(56) References Cited

U.S. PATENT DOCUMENTS

| | | |
|---|---|---|
| 468,098 A | 2/1892 | Hayward |
| 710,907 A | 10/1902 | Thompson |
| 1,567,694 A | 12/1925 | Amrin |
| 2,746,715 A | 5/1956 | Sherrod |
| 3,038,702 A | 6/1962 | Trunnell |
| 3,052,450 A | 9/1962 | Trunnell |
| 3,077,337 A | 2/1963 | Cronkright |
| 3,363,879 A | 1/1968 | Irik |
| 3,372,441 A | 3/1968 | Fisher |
| 3,834,674 A | 9/1974 | Jackson |
| 4,050,205 A | 9/1977 | Ligda |
| 4,358,089 A | 11/1982 | Metcalf |
| 4,456,225 A | 6/1984 | Lucas |
| 4,541,615 A | 9/1985 | King, Jr. |
| 4,589,632 A | 5/1986 | Smith |
| 4,738,634 A | 4/1988 | Taylor et al. |
| 4,946,137 A | 8/1990 | Adamczek |
| 5,029,817 A | 7/1991 | Tamm |
| 5,096,163 A | 3/1992 | Swearingen |
| 5,170,014 A | 12/1992 | Borsh |
| 5,271,605 A | 12/1993 | Damron |
| 5,297,690 A | 3/1994 | Bardaville |
| 5,488,198 A | 1/1996 | Kramer |
| 5,573,226 A | 11/1996 | Smith |
| 5,627,342 A | 5/1997 | Kramer |
| 6,349,460 B1 | 2/2002 | Eslambolchi et al. |
| 6,672,567 B1 | 1/2004 | Chembars |
| 7,178,226 B2 | 2/2007 | Manning |
| 7,604,220 B1 | 10/2009 | Tomlinson |
| 8,342,483 B1 | 1/2013 | Manning |
| 8,403,277 B2 * | 3/2013 | Nuernberger .......... H02G 3/125 174/58 |
| 8,704,396 B2 | 4/2014 | Leijon et al. |
| 8,785,774 B1 * | 7/2014 | Gretz ..................... H02G 3/126 174/50 |

* cited by examiner

*Primary Examiner* — Dhirubhai R Patel
(74) *Attorney, Agent, or Firm* — Steven M. Koehler; Westman, Champlin & Koehler, P.A.

(57) ABSTRACT

A wire guiding tool includes a support structure configured to removably mount the guiding tool to an electrical box. The support structure includes an aperture at a first position on the support structure that is configured to allow a fastener attached to the electrical box to extend through, and wherein the support structure is further configured to be removably mounted to the electrical box at a second position, the second position being remote from the aperture at the first position. A locking element is movably connected to the support structure to selectively engage the fastener to inhibit removal of the fastener from the aperture. A carriage assembly is carried by the support structure having a perimeter structure with a perimeter surface configured to guide a wire thereover without damaging the wire.

20 Claims, 11 Drawing Sheets

WIRE GUIDING TOOL

CROSS-REFERENCE TO RELATED APPLICATIONS

The present application is a continuation-in-part and claims priority to U.S. patent application Ser. No. 14/706,364, filed May 7, 2015, which claims the benefit of U.S. Provisional Patent Application Ser. No. 61/996,692, filed May 13, 2014, both of which are hereby incorporated reference in their entirety.

BACKGROUND

The discussion below is merely provided for general background information and is not intended to be used as an aid in determining the scope of the claimed subject matter.

Buildings and other structures having electrical service commonly include junction boxes and/or outlet boxes located in the ceilings, walls or floors where conduits between the various boxes provide passageways for the electrical wires connected to each other or to other components such as light switches and outlets mounted in the various boxes.

To wire the structure, after the boxes and conduits have been mounted within the ceiling, walls and floors with the conduits extending therebetween, electrical wires are pulled through the appropriate conduits as needed in order to provide an electrical connection between the same. Pulling the wire through the conduits is typically accomplished by using a fish tape that is inserted in one box and pushed through the conduit to the other box. The electrical wire(s) is connected to the remote end of the fish tape and once connected, the fish tape is pulled back through the conduit thereby pulling the wire(s) through the conduit. Although in some circumstances, particularly shorter runs, a single person can pull the wire(s) through the conduit, typically a second person is needed to help guide the wire(s) from the spool(s) into the box in order to prevent chaffing or other damage to the wire(s) due to the sharp edges that can exist on the junction boxes.

SUMMARY

This Summary and the Abstract herein are provided to introduce a selection of concepts in a simplified form that are further described below in the Detailed Description. This Summary and Abstract are not intended to identify key features or essential features of the claimed subject matter, nor are they intended to be used as an aid in determining the scope of the claimed subject matter. The claimed subject matter is not limited to the implementations that solve any or all disadvantages noted in the background.

A wire guiding tool includes a support structure configured to removably mount the guiding tool to an electrical box. The support structure comprises an aperture at a first position on the support structure that is configured to allow a fastener attached to the electrical box to extend through, and wherein the support structure is further configured to be removably mounted to the electrical box at a second position, the second position being remote from the aperture at the first position. A locking element is movably connected to the support structure to selectively engage the fastener to inhibit removal of the fastener from the aperture.

In further embodiments, the wire guiding tool can include one or more of the following features. The aperture can be a slot and the locking element is configured to inhibit at least partial movement of the fastener relative to the slot. The support structure can include a second aperture, such as a slot, at the second position configured to allow a second fastener attached to the electrical box to extend through, and if desired slide relative thereto. At least one of the slots can include a portion formed in the support structure that is configured to allow the tool to hang downwardly from one end. For instance, the support structure can include at least one flange extending away from the carriage assembly, the slot being formed in a major surface of the flange, and wherein the flange includes a portion extending in a direction away from the major surface, wherein the slot extends continuously from the major surface and into the portion. In one advantageous embodiment, the slot and the second slot are configured to receive fasteners of the electrical box that are spaced apart in the range between about 2.5 inches and about 6.5 inches, which allows the guiding tool to be used on a number of electrical boxes of different sizes.

The carriage assembly can include a first perimeter structure with a first inner perimeter surface configured to guide a wire thereover without damaging the wire and a second perimeter structure with a second inner perimeter surface configured to guide a wire thereover without damaging the wire and aligned with the first perimeter structure, the first perimeter structure and the second perimeter structure being carried by and separated from each other by a plurality of walls. The first perimeter structure and/or the second perimeter structure can include rollers, and if desired the rollers can be configured as opposed pairs. In addition or in the alternative, the first perimeter structure and the second perimeter structure can include guiding members that are stationary and have partial, non-rotatable, curved, for example, cylindrical surfaces. Such guiding members can be separate elements or formed integral with from a single unitary body from either the walls of the carriage assembly or the support structure.

The support structure can comprises a pair of flanges extending in opposite directions away from the carriage assembly. One or more the flanges can be movable relative to the carriage assembly to provide access to an opening in a wall of the carriage assembly. In one embodiment, the flange(s) can allow access to a first portion of the opening, while a portion of at least one of the first perimeter structure or the second perimeter structure is movable to fully expose the opening and enable a length of wire to be inserted in the carriage assembly, wherein the length of wire is inserted into the carriage assembly without inserting either end of the wire first through the carriage assembly.

DETAILED DESCRIPTION OF ILLUSTRATIVE EMBODIMENT

Figure 1:
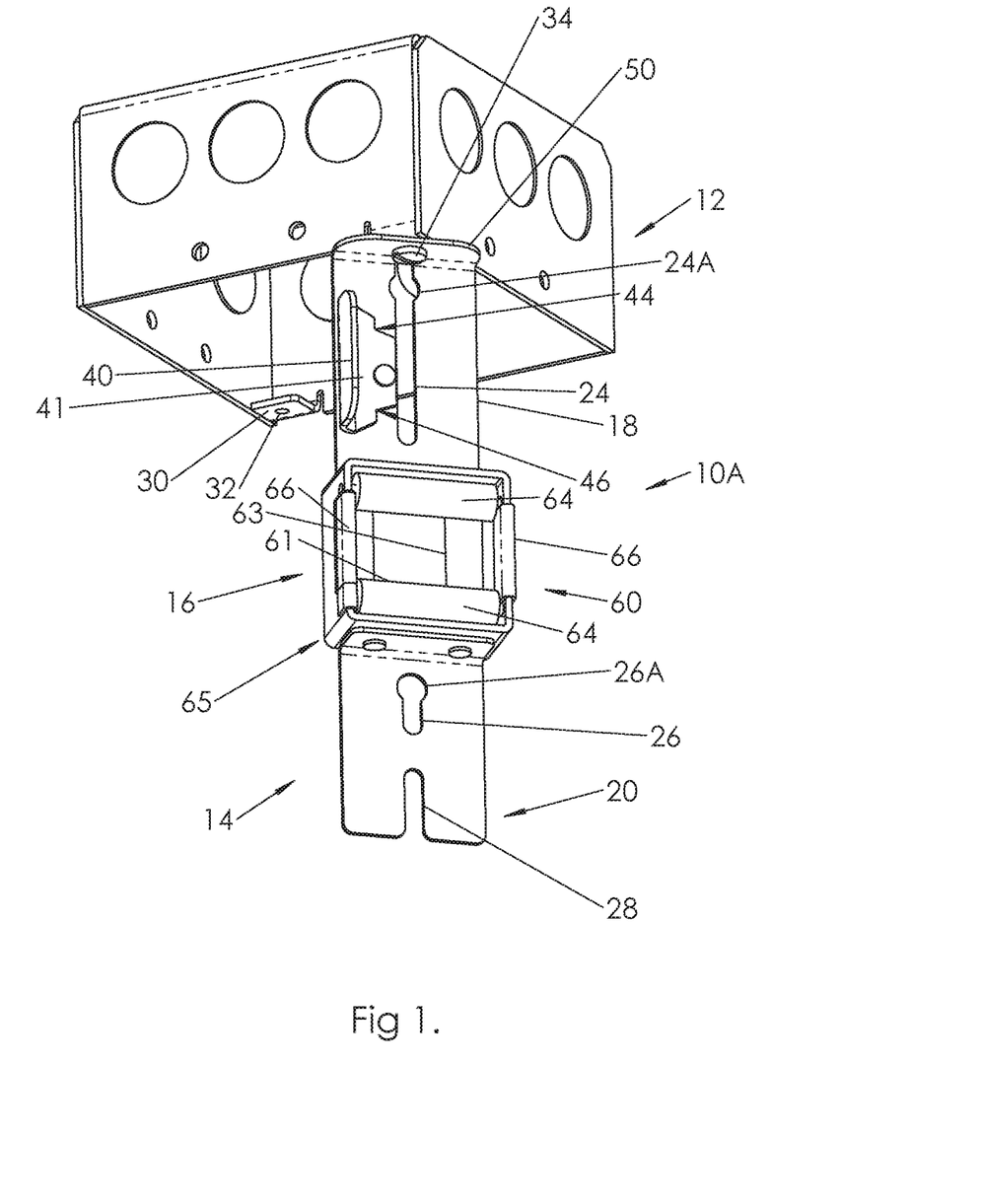
FIG. 1 is a perspective view of a wire guiding tool in a first position on an electrical box.
Figure 2:
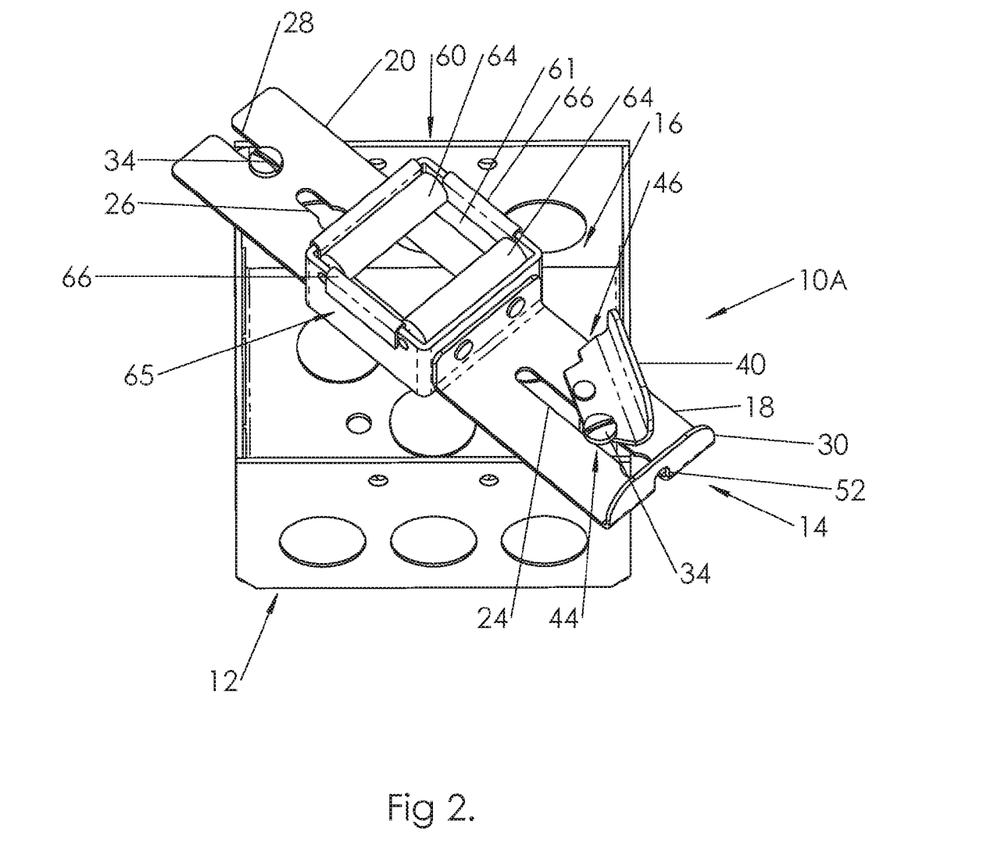
FIG. 2 is a perspective view of the wire guiding tool of FIG. 1 in a second position on the electrical box.
Figure 3:
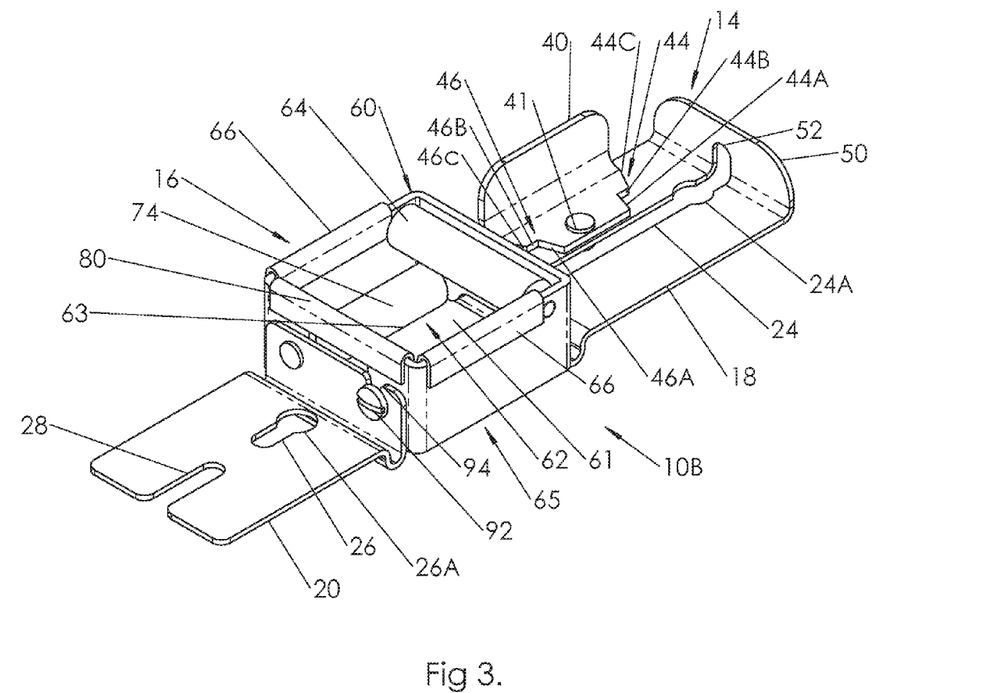
FIG. 3 is a perspective view of a second embodiment of a wire guiding tool viewed from above.
Figure 5:
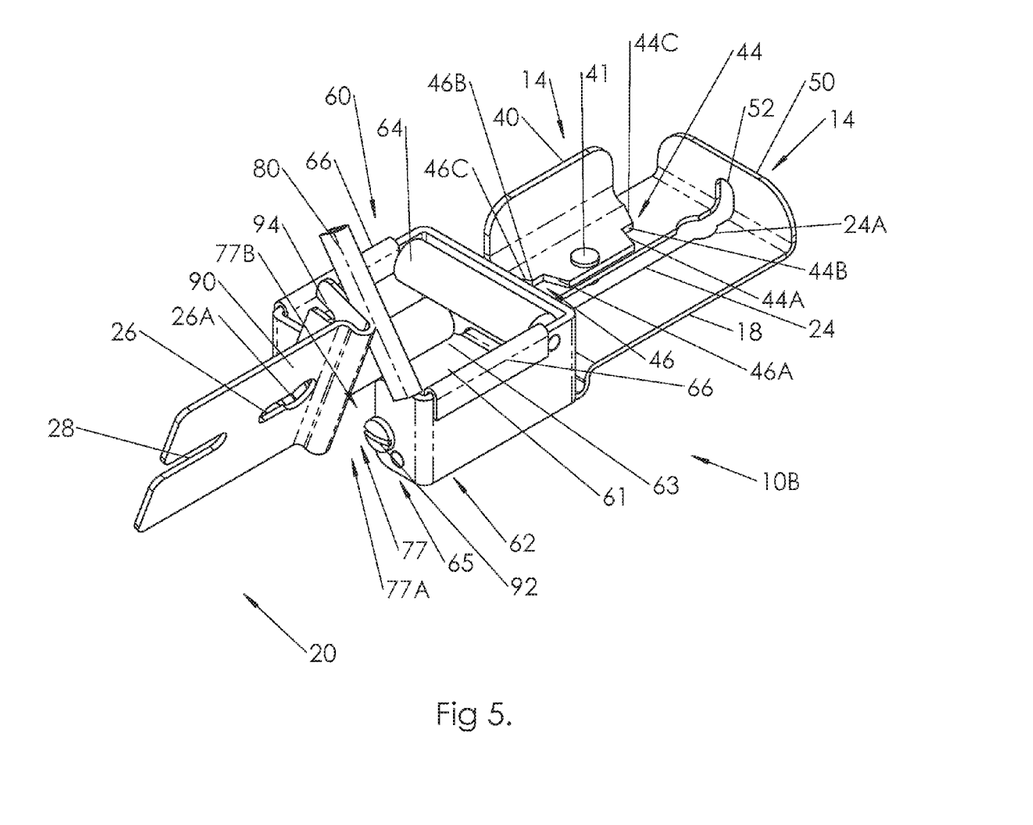
FIG. 5 is a perspective view of the wire guiding tool of FIG. 3 configured in a second position.

A wire guiding tool 10A for pulling wire into or out of an electrical box 12 is illustrated in FIGS. 1 and 2. The tool 10A generally includes a guiding carriage assembly 16 and a support structure 14 herein comprising two support flanges 18 and 20 extending in opposite directions from the carriage assembly 16. The support flanges 18 and 20 can be separate elements connected to the carriage assembly 16 or formed integral with the carriage assembly 16 from a single unitary body. As illustrated in FIGS. 3 and 5, in one embodiment, the support flange 20 is movably connected to the carriage assembly 16 for reasons discussed below.

The support structure 14 includes apertures, for example, slots for mounting the tool 10A to the electrical box 12. In particular, the tool 10A includes a first slot 24 extending in a direction away from the carriage assembly 16, and at least one other slot 26 and/or 28 extending in a direction away from the carriage assembly 16 in a direction opposite to slot 24. In the embodiment illustrated, slot 24 is provided in support flange 18, while slots 26 and 28 are provided in support flange 20. The slots 24, 26 and/or 28 are sized to receive a rod portion of a threaded fastener therethrough for securing the tool 10A to one of many different sizes of electrical boxes.

Electrical boxes are standard equipment used in the electrical trade and without limitation some electrical boxes that the wiring tool 10A can be used with include 4$^{11}/_{16}$ inches×4$^{11}/_{16}$ inches junction boxes, 4 square junction boxes, octagon junction boxes, 1 gang boxes, 2 gang boxes, 3 gang boxes etc. The electrical box 12 illustrated in FIGS. 1 and 2 includes tabs 30 in at least two opposed corners. Each of the tabs 30 include threaded holes 32 for receiving a threaded fastener 34 that are commonly used to mount a cover plate (not shown). Other forms of electrical boxes may have similar tabs along edges of the electrical box between rather than at the corners so that an electrical device such as an outlet or a light switch can be mounted to the electrical box. Using the slots 24, 26 or 28 the wiring tool 10A can be removably secured to at least any of the electrical boxes listed above although again only one form of electrical box is illustrated herein.

The widths of the slots 24, 26 and 28 are of size to receive the threaded portion of the threaded fasteners 34 while also being narrow enough such that the head portion of each fastener 34 does not extend through at least a portion of the slots 24, 26 and 28. In one embodiment, the width of the slots 24, 26 and 28 is of size to receive threaded fasteners 34 of #6, #8 and/or #10 size, while again inhibiting the head portion of each of these fasteners from extending through at least a portion of the slots 24, 26 and 28. In a preferred embodiment, the slots 24 and 26 include an enlarged portion 24A and 26A, respectively, having a width larger than other portions of their respective slots so as to allow the head portions of the fasteners 34 to extend therethrough when desired. This construction enables the tool 10A to be secured to the electrical box 12 while the threaded fasteners 34 remain threaded in the holes 32 such that the threaded fasteners 34 do not have to be removed from the threaded holes 32 and then reattached in order to secure the tool 10A to the electrical box 12. In contrast to an enlarged portion through which the head of the fastener can extend through, slot 28 opens to an edge of the support structure 14 such that the support structure 14, herein by example support flange 20, can be slid under the head portion of the fastener 34 which the fastener 34 is threaded into hole 32. Whether installed using the enlarged portions 24A, 26A of the slots 24, 26 and/or the open end of slot 28, once the guiding tool 10A has been positioned on the electrical box 12, one or more of the threaded fasteners 34 can be tightened, if desired, in order to fix the location of the guiding tool 10A on the electrical box 12.

In the embodiment illustrated, the guiding tool 10A includes an optional locking element or tab 40 that is movable on the support structure 14 herein being pivotally mounted to support flange 18. The locking tab 40 is rotatable so as to engage the threaded fastener 34 extending through a slot, herein slot 24. When the locking tab 40 is moved so as to engage the threaded fastener 34, the guiding tool 10A is secured in a fixed position on the electrical box 12 because the locking tab 40 in combination with edges of the slot 24 inhibit sliding movement (at least partially) of the threaded fastener 34 relative to the slot 24. Thus, in this manner, each of the threaded fasteners 34 can be secured to the electrical box 12 prior to the installation of the guiding tool 10A so as to allow the guiding tool 10A to slide under each of the head portions of the threaded fasteners 34 using for example the enlarged portions 24A, 26A of slot 24 and 26 or through the open ended portion of slot 28. The user can then slide the guiding tool 10A with respect to the electrical box 12 to a desired position, commonly to a position where the carriage assembly 16 is located in the center of the box 12, although this should not be considered limiting.

The locking tab 40 can then be moved, herein pivoted, so as to engage the fastener 34. At least one edge 44 and/or 46 is configured on the locking tab 40 so as to engage the threaded portion of the fastener 34. In the embodiment illustrated, each of the edges 44 and 46 comprise a plurality of edge segments, herein by example, three segments each 44A, 44B, 44C, 46A, 46B and 46C (see FIG. 3). Depending on the electrical box to which the guiding tool 10A is mounted, different edge segments 44A, 44B, 44C, 46A, 46B and 46C may be better configured to engage the fastener 34, hence, the different angles between the edge segments 44A, 44B, 44C, 46A, 46B and 46C. A pivot pin 41 securing the locking tab 40 on the flange 18 may not be centered between the edges 44 and 46, but rather, be offset as illustrated, which can be advantageous so that the guiding tool 10 can also be secured to various types or sizes of electrical boxes. Although illustrated where the locking tab 40 is pivotally movable in another embodiment, the locking tab 40 could be slidable linearly on the flange 18 between a position that engages the fastener 34 and a second position where the tab 40 does not engage the fastener 34.

FIG. 2 illustrates the guiding tool 10A mounted in a position on the electrical box 12 so as to guide wire(s) (not shown). However, FIG. 1 illustrates another position of the guiding tool 10A on the electrical box 12, which can also be advantageous. In particular, the position illustrated in FIG. 1 is when the guiding tool 10A is hanging from the electrical box 12 from one end, and in particular from one of the fasteners 34. This position is convenient because in some circumstances, the electrician may need to use both hands in order to perform some task and thus cannot hold the guiding tool 10A at the same time. Likewise, the electrician may want to leave the guiding tool 10A with the electrical box 12 in order to temporarily move to another location to perform some other task. To provide the convenient feature of hanging the tool 10A from the box 12, the support structure 14 includes a flange portion 50 and an aperture 52 configured so as to allow the guiding tool 10A to hang such as substantially orthogonal to the position of the guiding tool when guiding wire(s) into the electrical box as illustrated in FIG. 2. The flange portion 50 extends in a direction away from the major surface of the support structure 14 or support flange 18 so as to orient the aperture 52 in a manner to allow the guiding tool 10A to hang. In a particularly convenient form, the aperture 52 comprises a portion of the slot 24 having a width such that the head portion of the threaded fastener 34 does not extend therethrough. The aperture 52 in flange portion 50 opens to the enlarged portion 24A of the slot 24. In this manner, the guiding tool 10A can be oriented such that a head portion of the threaded fastener 34 will extend through the enlarged portion of the slot 24. The guiding tool 10A then can be slid and pivoted downwardly such that the threaded fastener 34 slides into the aperture 52. When the electrician desires that the guiding tool 10A be oriented in the position such as illustrated in FIG. 2, the guiding tool 10A can be pivoted upwardly and slid accordingly such that the threaded fastener 34 moves along or slides relative to slot 24 so that either of slots 26 or 28 can be then used with the other fastener 34 on the box 12 to mount the tool 10A in the position of FIG. 1.

Once mounted to the electrical box 12, the carriage assembly 16 is configured to guide wire(s) into or out of the electrical box 12. Generally, the carriage assembly 16 includes a first perimeter guiding structure 60 about a first aperture 61 and a second perimeter guiding structure 62 about a second aperture 63, the first perimeter guiding structure 60 and the second perimeter guiding structure 62, as well as the first aperture 61 and the second aperture 63 being separated from each other, respectively, by a depth of the carriage assembly 16 as defined by the perimeter walls 65. Both the first perimeter guiding structure 60 and the second perimeter guiding structure 62 have surface(s) configured to prevent chaffing or other damage to the wire(s) as the wire(s) moves through the carriage assembly 16. In the embodiment of FIGS. 1 and 2, each of the first and second perimeter structures 60, 62 comprise rollers 64 and stationary guiding members 66. In particular, rollers 64 are mounted to the carriage assembly 16 so as to oppose each other. Likewise, guiding members 66 are mounted on opposite sides of the first perimeter structure 60. The guiding members 66 herein each comprise a clip securable to the wall of the carriage assembly. The rollers 64 each have an outer cylindrical surface and the guiding members 66 each have enlarged curved surface herein partly cylindrical so as to provide a non-rotatable surface that inhibits chaffing upon the wire(s). If desired, the guiding members 66 can be formed from a portion of the carriage assembly 16 such as the walls 65, and hence, can be integral that is formed of a single unitary body. In the embodiment illustrated, as stated above, the guiding members 66 each comprise a clip. For example, the clip can be formed from a suitable plastic or other material that provides a smooth surface.

Figure 4:
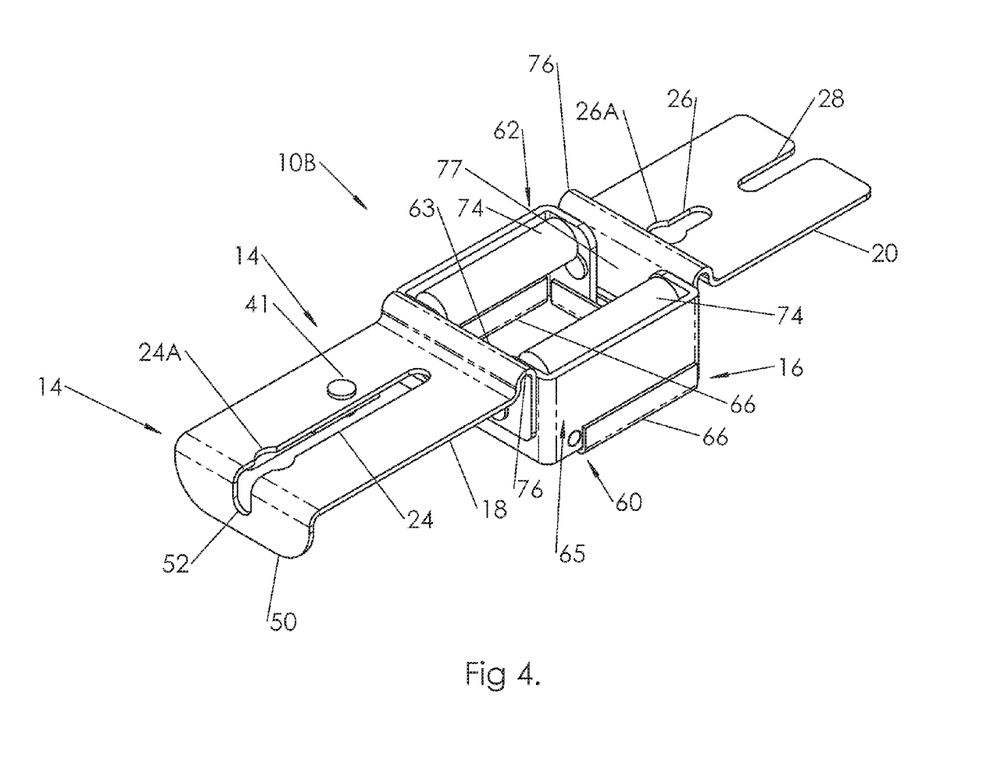
FIG. 4 is a perspective view of the wire guiding tool of FIG. 3 viewed from below.

FIG. 4 illustrates an embodiment of the second perimeter structure 62. In this embodiment, like the first perimeter structure 60, the second perimeter structure 62 includes opposed rollers 74 and opposed guiding members 76. Although the guiding members 76 could be formed from the walls 65 of the carriage assembly 16 or comprised of further rollers, in this embodiment, the smooth surfaces of the guiding members 76 are disposed on the support structure 14, and in particular, on each of the support flanges 18 and 20. In this embodiment, the guiding members 76 formed on the support flanges 18 and 20 extend away from major surfaces of the support flanges 18 and 20 to a height that approximately corresponds with the height of the rollers 74 extending beyond edges of the walls 65 forming the carriage assembly 16.

It should also be noted that a length of the guiding members 66, 76 is preferably selected so as to extend between and across at least a portion of the width of each of the rollers 64, 74 so as to provide overlap between inner surfaces of the rollers 64, 74 and inner surfaces of the guiding members 66, 76. In this manner, the overlap between inner surfaces of the rollers 64, 74 and inner surfaces of the guiding members 66, 76 helps ensure that contact of the wire(s) moving through the carriage assembly 16 either contacts roller 64, 74 and/or the guiding member 66, 76.

FIGS. 3-5 illustrate a further feature that can be provided on the guiding tool 10B. In this embodiment, the carriage assembly 16 includes an opening 77 through one of the walls 65 of the carriage assembly 16 from the first perimeter structure 60 (with the guiding member discussed below removed) to the second perimeter structure 62. In this embodiment, the support structure 14 and in particular the support flange 20 is selectively movable so as to provide a portion 77A of the opening 77 from the second perimeter structure 62, while a guiding member 80 forming part of the first perimeter structure 60 is also selectively movable so as to provide an upper portion 77B of the opening 77. Providing the opening 77 through one of the walls 65 of the carriage assembly 16 completely from the first perimeter structure 60 to the second perimeter structure 62 allows the user to remove or insert a length of wire(s) from or into the carriage assembly 16 when the wire(s) does not have an end that can be inserted otherwise through the openings of the first perimeter structure 60 and the second perimeter structure 62. For instance, the wire(s) that may need to be removed from the carriage assembly 16 or inserted into the carriage assembly 16 already may extend into one of the conduits connected to the electrical box, while the wire is still otherwise wound around a large spool. By having one or more movable components on the guiding tool 10B, the opening 77 through the wall of the carriage assembly 16 can be easily provided. In this embodiment, the support flange 20 is pivotally attached to the carriage assembly 16 using a pin 90 thereby allowing the support flange 20 to pivot and provide access to the opening 77. A fastener such as a threaded screw 92 engages a notch 94 in the support flange 20 when the support flange 20 is returned to a position to close the opening 77, the fastener 92 being configured so as to firmly hold the support flange 20 against the wall of the carriage assembly 16 when desired.

The guiding member 80 as stated above is also movable. In this embodiment, the guiding member 80 comprises a movable or removable clip similar to guiding members 66. If desired though, the guiding member could comprise a movable or removable roller.

Figure 6:
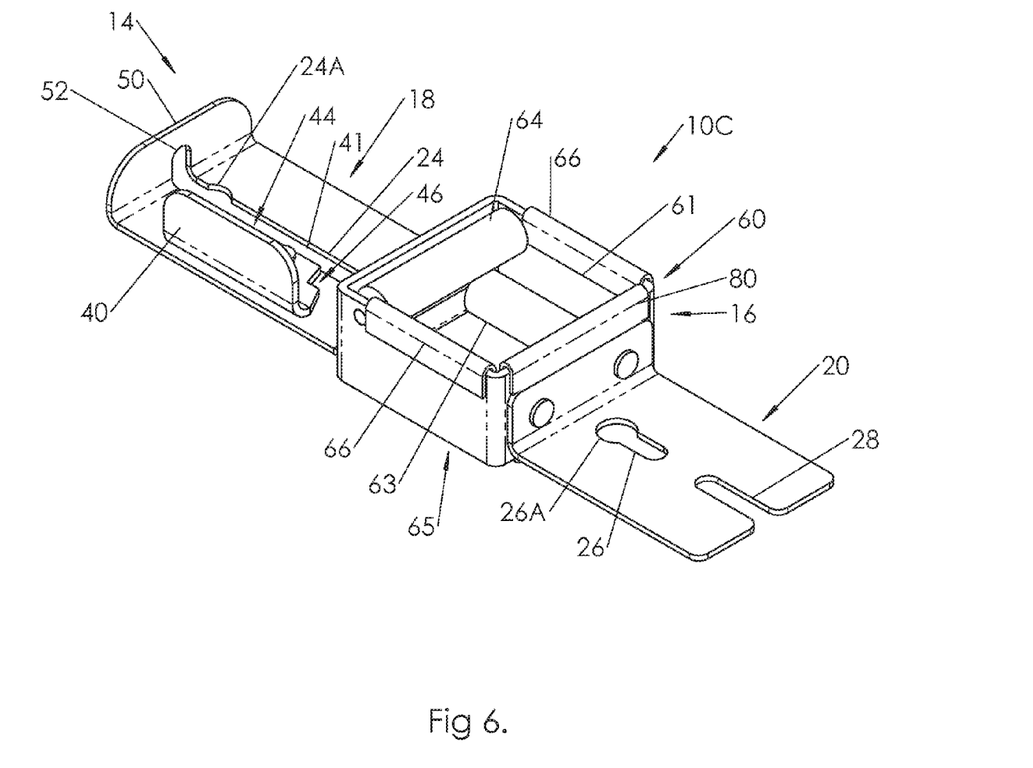
FIG. 6 is a perspective view of a third embodiment of a wire guiding tool viewed from above.
Figure 7:
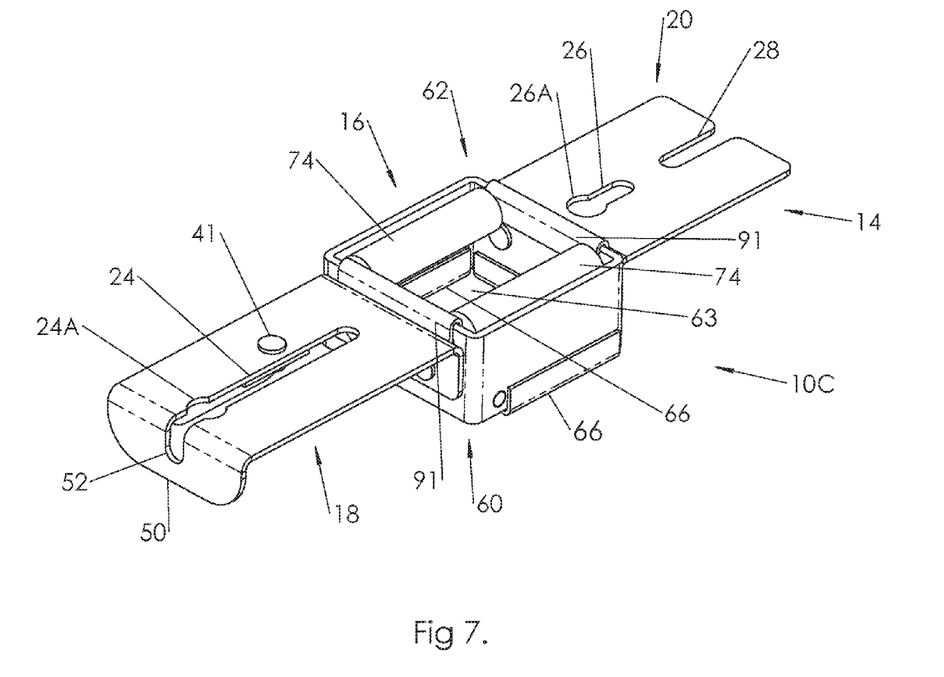
FIG. 7 is a perspective view of the wire guiding tool of FIG. 6 viewed from below.

In the embodiment 10C of FIGS. 6 and 7, opposed flanges 18 and 20 are similar to the embodiment of FIGS. 1 and 2 in that they do not include curved surfaces 76 of the embodiment of FIGS. 3 and 4. Rather, in order to provide a curved perimeter guiding structure 62, clips 92 are provided.

FIGS. 8-11 illustrate guiding tools 10D and 10E comprising further embodiments. In these embodiments, the carriage assembly 16 is integral with the support structure 14 (support flanges 18 and 20) being formed a single unitary body.

Figure 8:
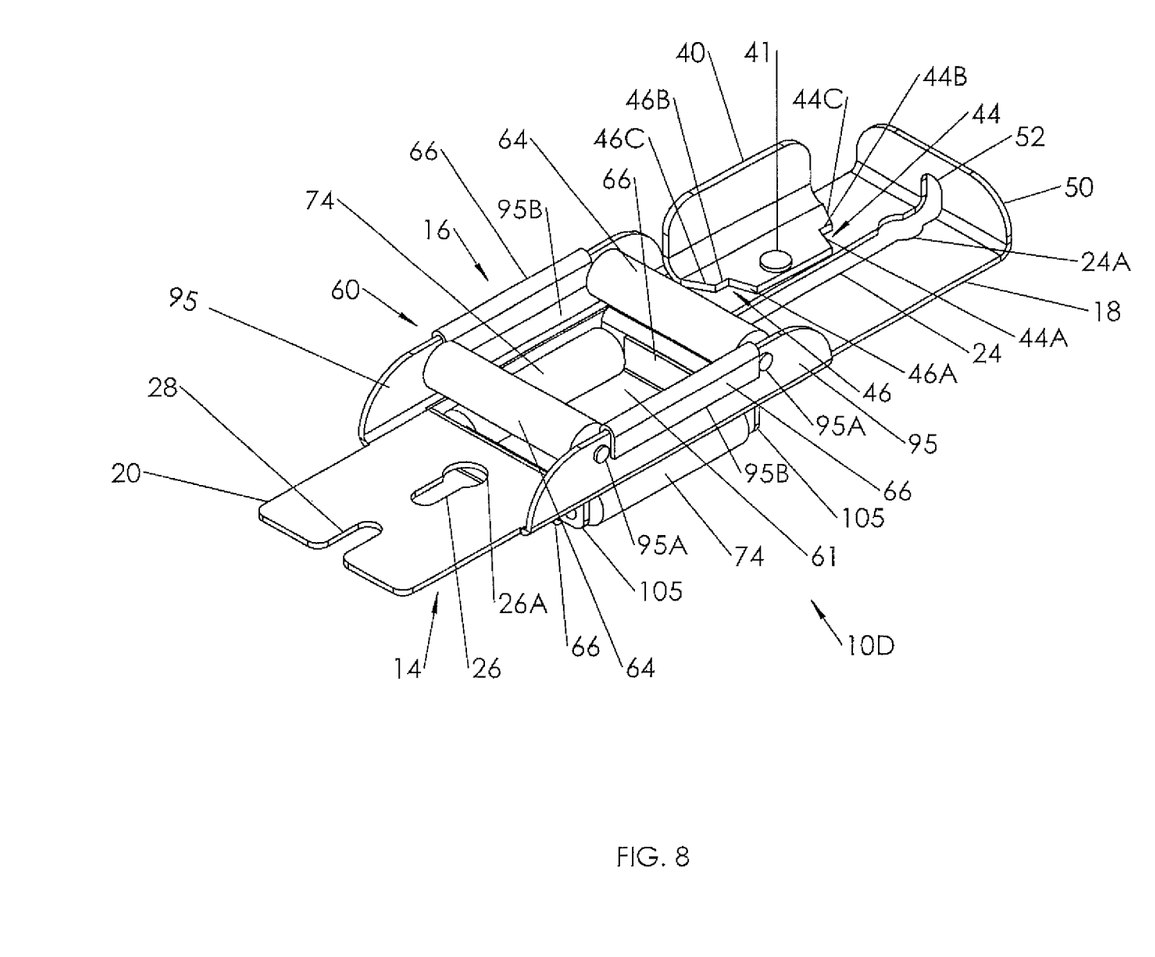
FIG. 8 is a perspective view of a fourth embodiment of a wire guiding tool viewed from above.
Figure 9:
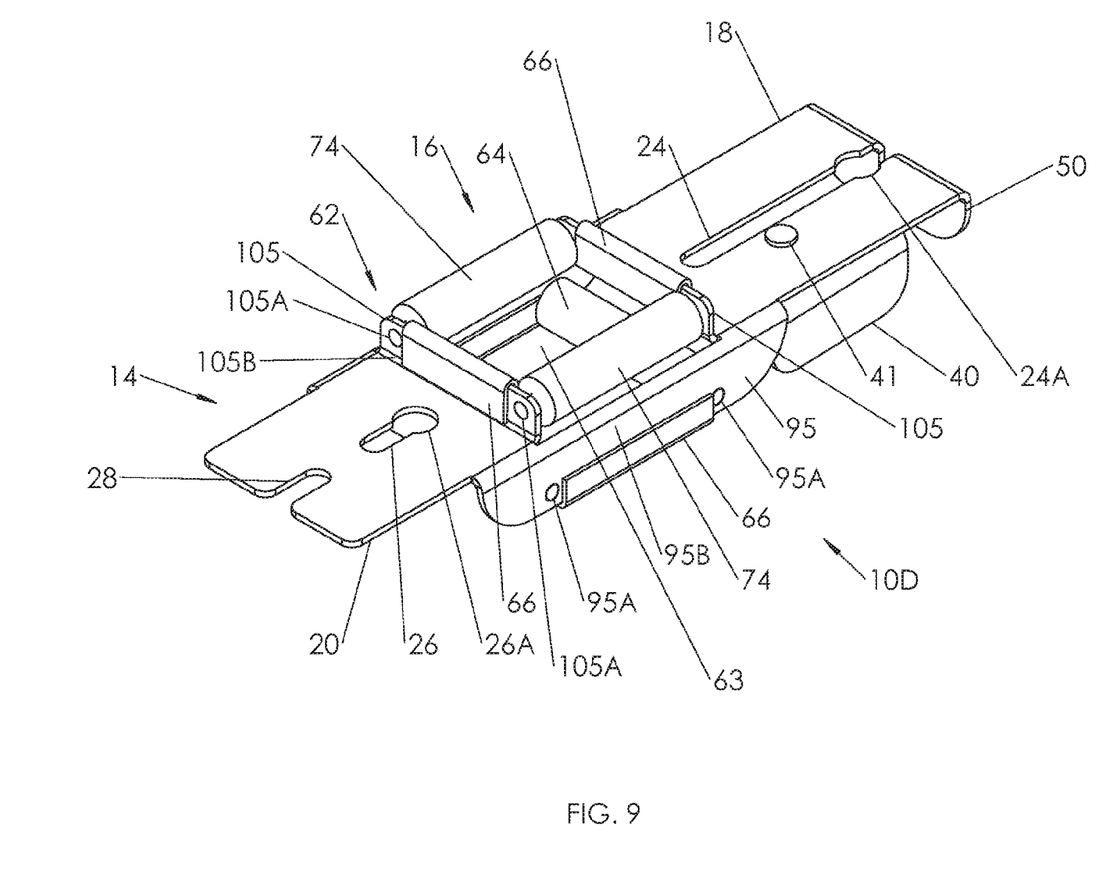
FIG. 9 is a perspective view of the wire guiding tool of FIG. 8 viewed from below.

As in the previous embodiments, the guiding tool 10D of FIGS. 8 and 9 has the first and second perimeter guiding structures 60, 62 about aperture 61,63 (each aperture 61, 63 being defined by the components of the associated perimeter guiding structures 60, 62). The first perimeter structure 60 comprises rollers 64 and guiding members 66, herein also comprising clips, which are optional. Both the rollers 64 and the guiding members 66 are supported by flanges 95 that are formed integral with the support structure 14 from a single unitary body. In a preferred embodiment, the support structure 14 and the flanges 95 are formed from a single sheet or plate of metal to have the various apertures described above as well as holes 95A to receive and support pins from the rollers 64 when the flanges 95 are bent upwardly as illustrated. Portions 95B of the flanges 95 between holes 95A receive and support the guiding members 66. In a similar fashion, flanges 105 can be formed integral with the support structure 14 from a single unitary body, bent as illustrated and provided with holes 105A to support rollers 74, wherein portions 105B support clips 66 or otherwise form the stationary guiding members.

It should be noted that the carriage assembly 16 of guiding tool 10D can also considered as having a plurality of walls, which in this embodiment comprise the pair of opposed flanges 95 and the pair of opposed flanges 105. Each of the flanges 95, 105 extend away from a major surface of the support structure 14. The pair of opposed flanges 95 extend away from the support structure 14 in a first direction, while the pair of opposed flanges 105 extend away from the support structure 14 in a second direction opposite the first direction.

Figure 10:
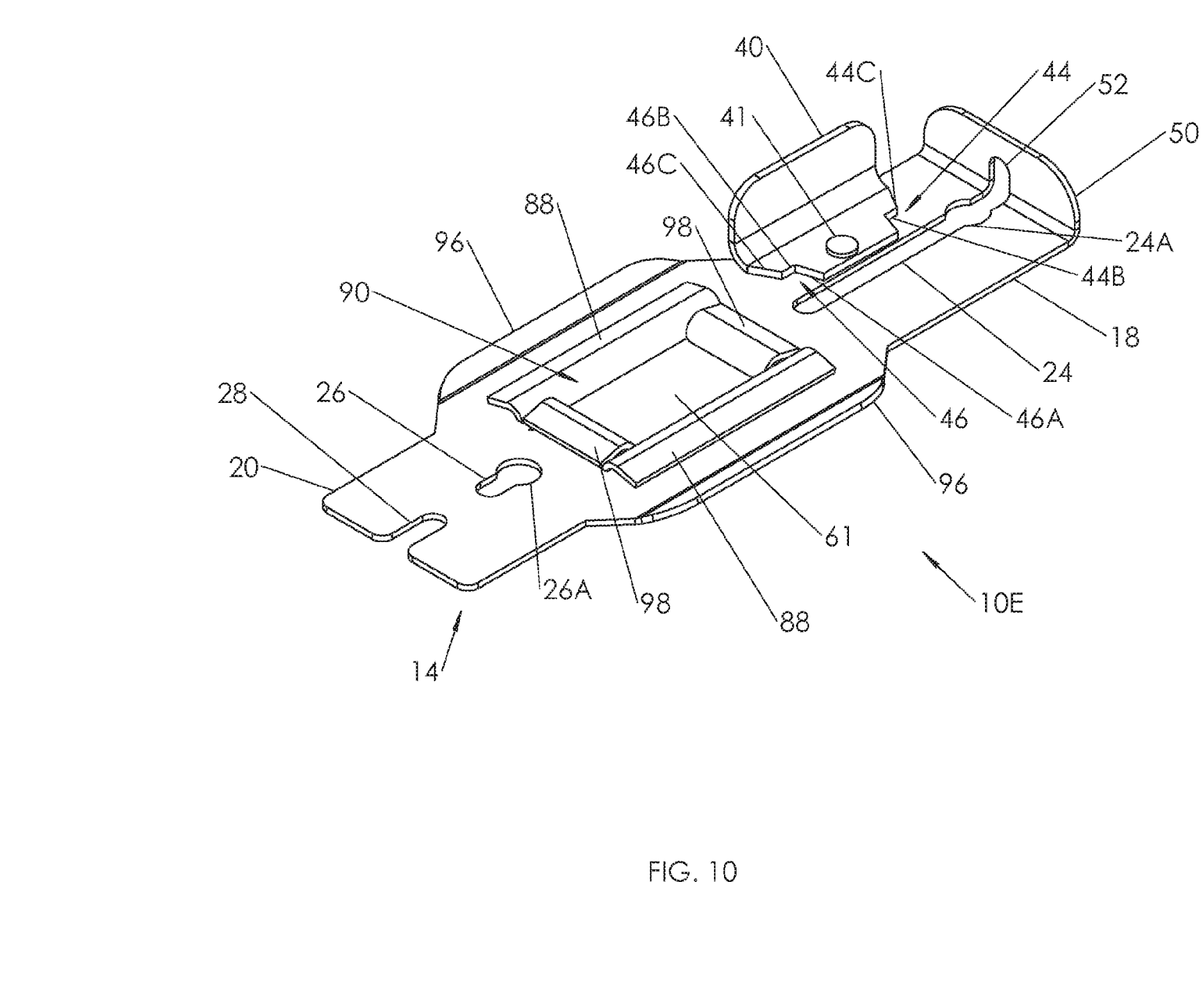
FIG. 10 is a perspective view of a fifth embodiment of a wire guiding tool viewed from above.
Figure 11:
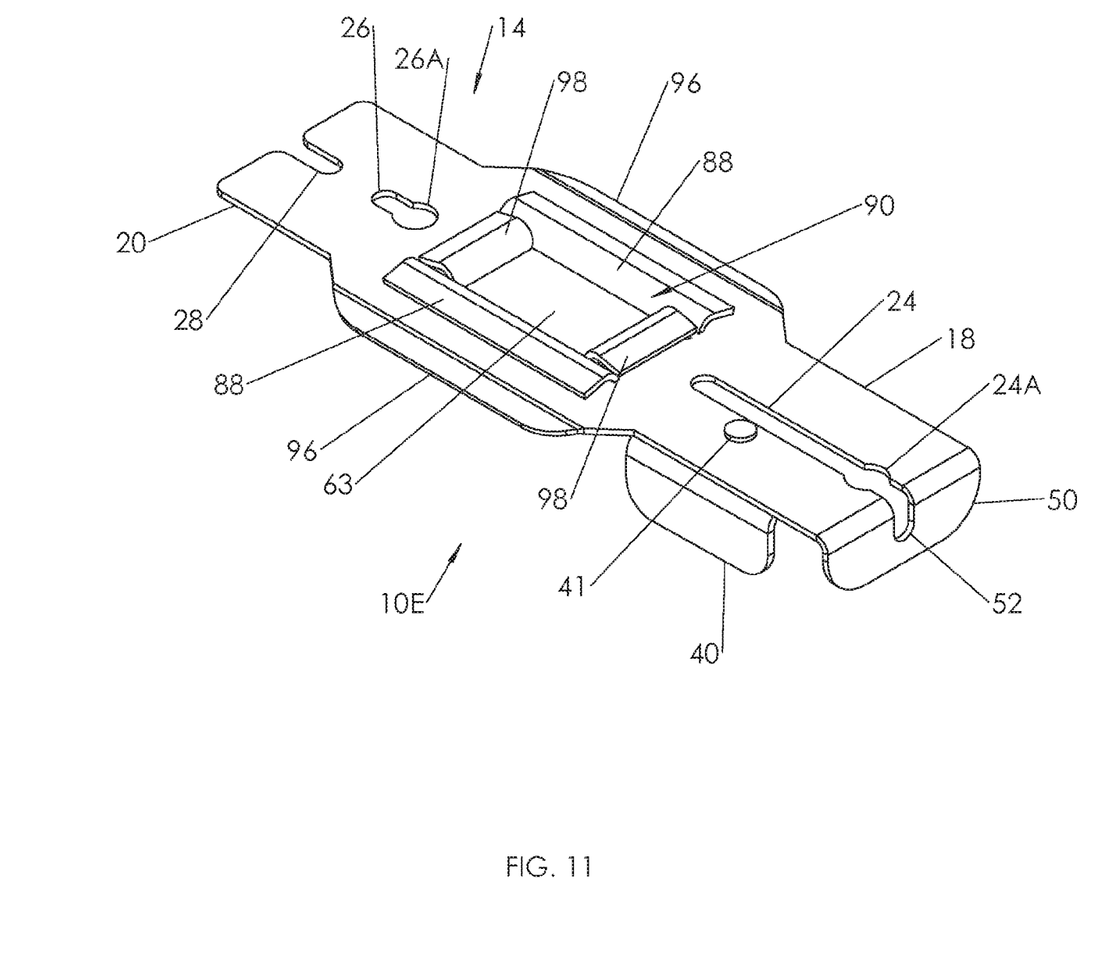
FIG. 11 is a perspective view of the wire guiding tool of FIG. 10 viewed from below.

In the guiding tool 10E of FIGS. 10 and 11 the carriage assembly 16 is again integral with support structure 14 being formed from a single unitary body. In this embodiment, a single aperture 63 is defined by internal perimeter guiding structure 90. In one convenient form, internal perimeter 90 is comprised of internal stationary guide members 88 and 98. The guiding members 88, 98 may each comprise a clip securable to the material forming the support structure 14.

FIGS. 10 and 11 illustrate a further feature of this embodiment in which the guiding tool 10E includes external structural support flanges 96 formed integral with the support structure 14 from a single unitary body. The support flanges 96 are selectively bendable or foldable so as to provide increased rigidity by inhibiting bending of the guiding tool 10 along portions proximate the aperture 63.

Each of the guiding tools 10D and 10E can also include the various mounting apertures and locking tab 40 as described above.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A wire guiding tool comprising:
    a support structure configured to removably mount the guiding tool to an electrical box, wherein the support structure comprises an aperture at a first position on the support structure that is configured to allow a fastener attached to the electrical box to extend through, and wherein the support structure is configured to be removably mounted to the electrical box at a second position, the second position being remote from the aperture at the first position; and
    a carriage assembly having a plurality of walls carried by the support structure comprising:
        a first perimeter guiding structure carried by the carriage assembly, the first perimeter guiding structure comprising one or more rollers and/or one or more guiding members having non-rotatable, enlarged curved surfaces to guide a wire thereover without damaging the wire; and
        a second perimeter guiding structure carried by the carriage assembly and aligned with the first perimeter guiding structure, the second perimeter guiding structure comprising one or more rollers and/or one or more guiding members having non-rotatable, enlarged curved surfaces to guide a wire thereover without damaging the wire carried by the carriage assembly and separated from the first perimeter guiding structure by the plurality of walls of the carriage assembly.

2. The wire guiding tool of claim 1 and further comprising a locking element movably connected to the support structure to selectively engage the fastener to inhibit removal of the fastener from the aperture.

3. The wire guiding tool of claim 2 wherein the aperture comprises a first slot and the locking element inhibits at least partial movement of the fastener relative to the first slot.

4. The wire guiding tool of claim 3 wherein the support structure comprises a second aperture comprises a second slot at the second position configured to allow a second fastener attached to the electrical box to extend through.

5. The wire guiding tool of claim 4 wherein the second slot is configured to allow the second fastener attached to the electrical box to slide relative to the second slot.

6. The wire guiding tool of claim 5 wherein the first slot and the second slot are configured to receive fasteners that are spaced apart in the range between about 2.5 inches and about 6.5 inches.

7. The wire guiding tool of claim 6 wherein an end of one of the slots is configured to allow the tool to hang downwardly on one of the fasteners on the electrical box from one end of the support structure.

8. The wire guiding tool of claim 5 wherein each of the first perimeter guiding structure and the second perimeter guiding structure comprises a pair of opposed rollers.

9. The wire guiding tool of claim 8 each pair of opposed rollers are supported by a separate pair of walls of the plurality of walls of the carriage assembly.

10. The wire guiding tool of claim 9 wherein pairs of stationary guiding members are secured to opposite walls, each stationary guiding member having a partial curved, non-rotatable surface.

11. The wire guiding tool of claim 9 wherein the plurality of walls comprise flanges extending away from a major surface of the support structure.

12. The wire guiding tool of claim 11 wherein flanges are formed integral with the support structure from a single unitary body.

13. The wire guiding tool of claim 12 wherein the flanges comprise a first pair of opposed flanges and a second pair of opposed flanges, the first pair extending away from the support structure in a first direction, and the second pair of opposed flanges extending away from the support structure in a second direction opposite the first direction.

14. The wire guiding tool of claim 13 wherein a portion of each flange between pairs of rollers comprises a partial curved, non-rotatable surface.

15. The wire guiding tool of claim 14 wherein each partial curved, non-rotatable surface comprises a clip secured to each associated flange.

16. The wire guiding tool of claim 2 wherein the locking element is pivotally connected to the support structure.

17. The wire guiding tool of claim 5 wherein the locking element is pivotally connected to the support structure.

18. The wire guiding tool of claim 1 wherein the first perimeter guiding structure comprises a pair of opposed rollers.

19. The wire guiding tool of claim 1 wherein at least one of the first perimeter guiding structure and the second perimeter guiding structure comprises a pair of opposed rollers.

20. The wire guiding tool of claim 19 wherein the pair of opposed rollers are supported by a first pair of the plurality of walls of the carriage assembly.

\* \* \* \* \*

UNITED STATES PATENT AND TRADEMARK OFFICE
CERTIFICATE OF CORRECTION

PATENT NO. : 9,509,127 B1
APPLICATION NO. : 15/046241
DATED : November 29, 2016
INVENTOR(S) : John A. Bergstrom It is certified that error appears in the above-identified patent and that said Letters Patent is hereby corrected as shown below:

In the Claims

Column 8, Line 29, after "aperture", delete "comprises", insert --comprising--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*